United States Patent
Koyama et al.

(10) Patent No.: US 8,243,826 B2
(45) Date of Patent: Aug. 14, 2012

(54) ENCODED STREAM TRANSMITTER

(75) Inventors: Kazuhiro Koyama, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 945 days.

(21) Appl. No.: 12/282,296

(22) PCT Filed: Jan. 17, 2007

(86) PCT No.: PCT/JP2007/050570
§ 371 (c)(1),
(2), (4) Date: Sep. 9, 2008

(87) PCT Pub. No.: WO2007/108222
PCT Pub. Date: Sep. 27, 2007

(65) Prior Publication Data
US 2009/0060059 A1    Mar. 5, 2009

(30) Foreign Application Priority Data
Mar. 17, 2006    (JP) .................................. 2006-074333

(51) Int. Cl.
*H04N 7/12* (2006.01)
(52) U.S. Cl. .................................................. 375/240.27
(58) Field of Classification Search ............. 375/240.26, 375/240.27, 240.28, 240.29
See application file for complete search history.

(56) References Cited

U.S. PATENT DOCUMENTS

2003/0142752 A1* 7/2003 Demas et al. ............. 375/240.27
2003/0193940 A1* 10/2003 Kugumiya .................... 370/389

FOREIGN PATENT DOCUMENTS

| EP | 1235412 A1 | 8/2002 |
|---|---|---|
| EP | 1501228 A1 | 1/2005 |
| JP | 10336247 A | 12/1998 |
| JP | 11262001 A | 9/1999 |
| JP | 2002-261824 A | 9/2002 |
| JP | 2002-359603 A | 12/2002 |
| JP | 2003-037574 A | 2/2003 |
| JP | 2003-179863 A | 6/2003 |
| JP | 2003-284066 A | 10/2003 |
| JP | 2003-318864 A | 11/2003 |
| JP | 2004-158936 A | 6/2004 |
| JP | 2004-159371 A | 6/2004 |
| JP | 2004-297184 A | 10/2004 |
| JP | 2005-175614 A | 6/2005 |

(Continued)

OTHER PUBLICATIONS

Handley M et al: "RFC 1327: SDP: Session Description Protocol" Network Working Group Request for Comments, XX, XX, Apr. 1998, pp. 1-42, XP002278846.

(Continued)

*Primary Examiner* — Gilberto Barron, Jr.
*Assistant Examiner* — Malcolm Cribbs
(74) *Attorney, Agent, or Firm* — Sughrue Mion, PLLC (57) ABSTRACT

The accuracy of time information set in a packet is improved. Time information calculator 24 calculates time information, using the encoding information received by control information receiver 23 and the encoded stream received by encoded stream receiver 21. When the time information is not pertinent, time information calculator 24 corrects the time information and outputs the corrected time information. Encoded stream packetizer 22 packetizes the encoded stream by setting the time information output by time information calculator 24 into the header portion.

20 Claims, 2 Drawing Sheets

FOREIGN PATENT DOCUMENTS

| | | |
|---|---|---|
| JP | 2005-516547 A | 6/2005 |
| JP | 2005-328131 A | 11/2005 |
| JP | 2006-013583 A | 1/2006 |
| JP | 2006-50656 A | 2/2006 |
| WO | 2004/019575 A1 | 3/2004 |
| WO | 2005/027439 A1 | 3/2005 |

OTHER PUBLICATIONS

Japanese Office Action dated Nov. 22, 2011 issued by the Japanese Patent Office in corresponding Japanese Patent Application No. 2008-506181.

* cited by examiner

ENCODED STREAM TRANSMITTER

TECHNICAL FIELD

The present invention relates to an encoded stream transmitter for transmitting an encoded stream packetwise.

BACKGROUND ART

Communications systems which transmit encoded motion picture data (an encoded stream) packetwise via communication networks such as IP networks etc., have been becoming widespread. As a communication protocol for transmitting multimedia data such as encoded streams etc., by packets, there is a protocol called RTP (Real-time Transport Protocol). RTP is used as a communication protocol on the upper layer protocol over UDP (User Datagram protocol) which is the communication protocol belonging to the layer higher than IP (Internet Protocol) layer.

Figure 1:
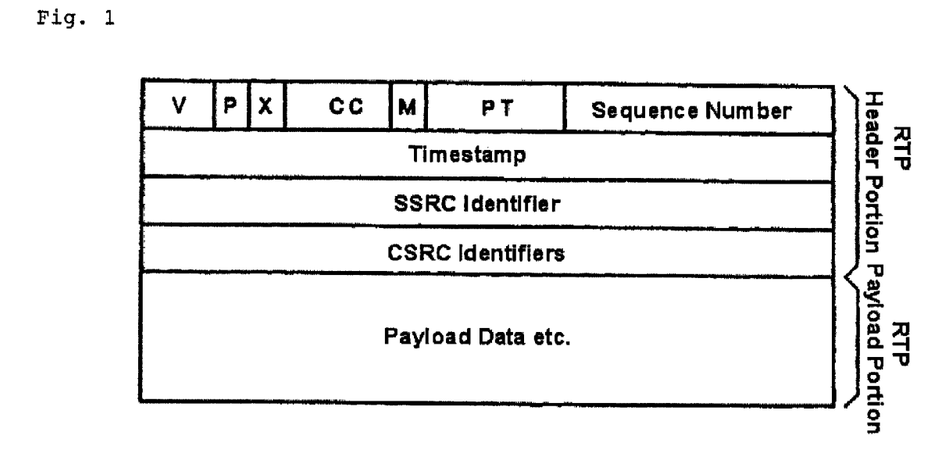
FIG. 1 is an illustrative diagram showing one example of a RTP packet configuration.

A packet (RTP packet) in RTP is make up of as shown in FIG. 1 for example, of a RTP header portion and a RTP payload portion (e.g., see patent document 1). The RTP header portion includes a timestamp and a marker bit (M).

The timestamp indicates the time at which the packet (specifically, the first octet) is transmitted. The timestamp is used to schedule reconstruction of packets on the packet receiver side.

A marker bit indicates an important event (for example, the last packet of the encoded stream and the boundary of a frame) in the encoded stream. On the packet receiver side, the marker bit is used to determine the important event in the encoded stream.

The parameters (time and the value representing an event) of the timestamp and marker bit are calculated from the encoded stream.

As the schemes for sending encoding information (e.g., time resolution) of the encoded stream, there are two kinds; one is the scheme that transmits the encoding information together with the encoded stream and the other is the scheme that transmits the encoding information separately from the encoded stream. These schemes are described in patent document 2, for example. Here, the encoding information of the encoded stream is information related to the encoding of the encoded stream, e.g., time resolution.

Patent document 1: Japanese Patent Application Laid-open 2005-328131 (paragraph 0011, FIG. 2)

Patent document 2: Japanese Patent Application Laid-open 2006-13583 (paragraph 0007, FIG. 2).

DISCLOSURE OF INVENTION

Problems to be Solved by the Invention

There exists an encoded stream transmitter that receives an encoded stream via a transmission path, packetizes the received encoded stream and sends it out to a packet communication network. With such an encoded stream transmitter, there are cases in which the parameters of the timestamp and marker bit are calculated from the encoded stream as mentioned above.

In this case, there is the problem that if the encoded stream with a bit error having occurred on the transmission path is received or if data loss has occurred on the transmission path, it is impossible to correctly set the timestamp for the packet. There is also the problem that if an encoded stream with a bit error having occurred on the transmission path is received or if data loss has occurred on the transmission path, it is impossible to correctly set the marker bit for the packet.

The present invention is an invention for solving the above problems, it is therefore an object to provide an encoded stream transmitter capable of improving the accuracy of at least one of time information such as a timestamp or the like set for a packet and information such as a marker bit or the like representing the boundary of a frame.

Means for Solving the Problems

In order to attain the above object, an encoded stream transmitter of the present invention is an encoded stream transmitter for transmitting an encoded stream packetwise, comprising: an encoded stream receiver for receiving said encoded stream; a control information receiver for receiving the encoding information of said encoded stream; a time information calculator which calculates the value of time information, using the encoding information received by said control information receiver and the encoded stream received by said encoded stream receiver, outputs the calculated value of time information when the calculated value is pertinent, and corrects the calculated value and outputs the corrected value of time information when the calculated value is not pertinent; and an encoded stream packetizer which packetizes the encoded stream received by said encoded stream receiver by setting the time information output by said time information calculator into the header portion.

According to the above invention, if the value of time information is not pertinent, the value is corrected. Accordingly, even if, for example a bit error or data loss occurs in the transmission path, it is possible to set up pertinent time information in the packet. As a result, it is possible to improve the accuracy of the time information that is set up in the packet.

Also, an encoded stream transmitter of the present invention is an encoded stream transmitter for transmitting an encoded stream packetwise, comprising: an encoded stream receiver for receiving said encoded stream; a control information receiver for receiving the encoding information of said encoded stream; a frame boundary extractor which, using the encoding information received by said control information receiver, extracts a frame boundary from the encoded stream received by said encoded stream receiver, and outputs the information representing said extracted frame when said extracted frame boundary is pertinent and corrects said frame boundary and outputs the information representing the corrected frame boundary when said extracted frame boundary is not pertinent; and an encoded stream packetizer which packetizes the encoded stream received by said encoded stream receiver by setting the information representing the frame boundary output from the frame boundary extractor into the header portion.

According to the above invention, if the frame boundary is not pertinent, the frame boundary is corrected. Accordingly, even if, for example a bit error or data loss occurs in the transmission path, it is possible to set up a pertinent frame boundary in the packet. As a result, it is possible to improve the accuracy of the information representing the frame boundary that is set up in the packet.

An encoded stream transmitter of the present invention is an encoded stream transmitter for transmitting an encoded stream packetwise, comprising: an encoded stream receiver for receiving said encoded stream; a control information receiver for receiving the encoding information of said encoded stream; a time information calculator which calculates the value of time information, using the encoding information received by said control information receiver and the encoded stream received by said encoded stream receiver, outputs the calculated value of time information when the calculated value is pertinent, and corrects the calculated value and outputs the corrected value of time information when the calculated value is not pertinent; a frame boundary extractor which, using the encoding information received by control information receiver, extracts a frame boundary from the encoded stream received by said encoded stream receiver, and outputs the information representing said extracted frame when said extracted frame boundary is pertinent and corrects said frame boundary and outputs the information representing the corrected frame boundary when said extracted frame boundary is not pertinent; and an encoded stream packetizer which packetizes the received encoded stream by said encoded stream receiver by setting, the time information output by said time information calculator, and the information representing the frame boundary output from the frame boundary extractor, into the header portion.

According to the above invention, if the value of time information is not pertinent, the value is corrected. Also, if the frame boundary is not pertinent, the frame boundary is corrected. Accordingly, even if, for example a bit error or data loss occurs in the transmission path, it is possible to set up the pertinent time information and frame boundary. As a result, it is possible to improve the accuracy of the time information and information representing the frame boundary which are set up in the packet.

Further, it is preferable that said encoded stream receiver receives an MPEG-4 based encoded stream, and said time information calculator calculates said time information using at least one of "modulo_time_base" and "vop_time_increment" contained in the encoded stream received by said encoded stream receiver. It is also preferable that said encoded stream receiver receives an MPEG-4 based encoded stream, and said frame boundary extractor extracts said frame boundary, using the start code contained in the encoded stream received by said encoded stream receiver.

It is also preferable that said control information receiver receives MPEG-4 based DCI as said encoding information and extracts "vop_time_increment_resolution" from said DCI; and said time information calculator calculates said time information, using said "vop_time_increment_resolution" extracted by control information receiver and the encoded stream received by said encoded stream receiver.

It is also preferable that said control information receiver receives MPEG-4 based DCI as said encoding information and extracts "profile_and_level_indication" from said DCI; and said frame boundary extractor extracts said frame boundary from the encoded stream received by said encoded stream receiver, using said "profile_and_level_indication" extracted by said control information receiver.

It is also preferable that said control information receiver receives encoding information based on IETF Recommendation RFC2327(SDC) as said encoding information.

It is also preferable that said control information receiver receives encoding information based on ITU-T Recommendation H.245 as said encoding information.

It is also preferable that said control information receiver receives MPEG-4 based DCI as said encoding information.

Effect of the Invention

According to the present invention, the accuracy of at least one of the time information and the information representing the frame boundary set in the packet can be improved.

BEST MODE FOR CARRYING OUT THE INVENTION

Figure 2:
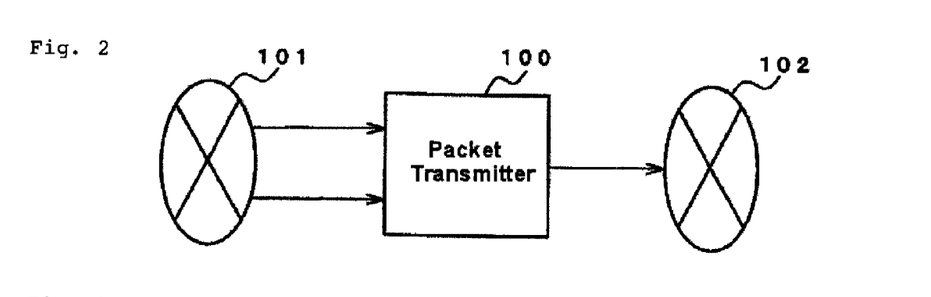
FIG. 2 is a system configurational diagram showing one example of a communication system including a packet transmitter as an encoded stream transmitter according to the present invention.

FIG. 2 is a system configurational diagram showing one example of a communication system including packet transmitter 100 as an encoded stream transmitter according to the present invention. In FIG. 2, packet transmitter 100 is connected to transmission paths 101 and 102.

Transmission path 101 transmits the encoded stream that was transmitted by a device (not shown) for outputting encoded streams and encoding information for the encoded stream to packet transmitter 100. Transmission path 102 transmits the encoded stream packetized by packet transmitter 100 to a device (not shown) for receiving encoded streams. Hereinbelow, the device for outputting encoded streams is called an encoded stream output device, and the device for receiving packetized encoded streams is called a packet receiver.

Hereinbelow, MPEG-4 is used as one example of an encoding scheme. Also, the packet (RTP packet) based on RTP is used as one example of a packet.

Also, though the encoded stream output device may transmit an encoded stream including DCI (Decoder Configuration Information) as encoding information, the following description will be made taking an example in which the encoded stream output device transmits encoding information separately from the encoded stream.

(Exemplary Embodiment 1)

Figure 3:
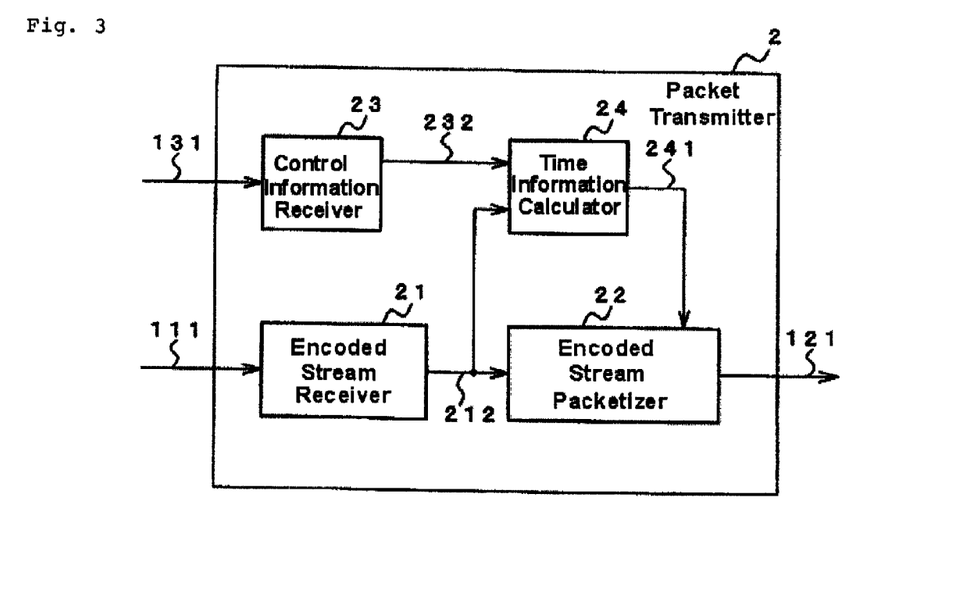
FIG. 3 is a block diagram showing a configurational example of a packet transmitter of the first exemplary embodiment.

FIG. 3 is a block diagram showing a configurational example of packet transmitter 2 of the first exemplary embodiment. Packet transmitter 2 shown in FIG. 3 corresponds to packet transmitter 100 shown in FIG. 2.

Packet transmitter 2 includes encoded stream receiver 21, encoded stream packetizer 22, control information receiver 23 and time information calculator 24.

It should be transmit encoding information, containing at least the following information at an event when an encoding stream starts to be sent or the like.

(1) Time resolution (vop_time_increment_resolution)

Further, the encoded stream output device transmits an encoded stream in VOP (video_object_plane) units. Here, the header of the VOP contains information as follows, for example.

(2) Time base (modulo_time_base)

(3) Lapse time (e.g., vop_time_increment)

"Modulo time_base" is information based on the second unit while "vop_time_increment" is information based on a unit smaller than the second unit. "Modulo_time_base" represents change of the current VOP value on the second unit from the previous VOP value on the second unit. "Vop_time_increment" is the accuracy given by "vop_time_increment_resolution", and represents information on the variation based on a unit smaller than the second unit.

Hereinbelow, combination of "modulo_time_base" and "vop_time_increment" may be referred to as a time increment.

Encoded stream receiver 21 receives encoded stream 111 from the encoded stream output device by way of transmission path 101. Also, encoded stream receiver 21 outputs encoded data 212.

Control information receiver 23 receives encoding information 131 of encoded stream 111 from the encoded stream output device by way of transmission path 101. Also, control information receiver 23 outputs time resolution 232.

Time information calculator 24, based on time resolution 232 output from control information receiver 23 and encoded data 212 output from encoded stream receiver 21, calculate the value of time information 241. Time information calculator 24 also outputs time information 241 having that value.

Encoded stream packetizer 22 sets time information 241 output from time information calculator 24 into RTP header portion and also sets encoded data output by encoded stream receiver 21 into the RTP payload portion to thereby RTP-packetize encoded stream 111. Further, encoded stream packetizer 22 sends out the RTP-packetized encoded stream 111 as RTP packets 121 to transmission path 102. RTP packets 121 are transmitted to the packet receiver via transmission path 102.

Next, the operation of packet transmitter 2 will be described with reference to FIGS. 2 and 3.

When receiving encoding information 131 from the encoded stream output device by way of transmission path 101, control information receiver 23 extracts "vop_time_increment_resolution" from encoding information 131. Control information receiver 23 outputs the extracted "vop_time_increment_resolution" as time resolution 232 to time information calculator 24.

Encoded stream receiver 21, when receiving encoded stream 111 from the encoded stream output device by way of transmission path 101, deletes the header information or the like that has been given for transmission through transmission path 101, from encoded stream 111. Encoded stream receiver 21 outputs the encoded stream 111 with its header information and the like deleted, to encoded stream packetizer 22 and time information calculator 24 as encoded data 212.

Time information calculator 24 receives encoded data 212 from encoded stream receiver 21 and also receives time resolution 232 from control information receiver 23.

Time information calculator 24 extracts the time increment from encoded data 212. Then, time information calculator 24, based on the extracted time increment and time resolution 232, calculates the value of time information 241.

Specifically, first, time information calculator 24 checks the unit of "vop_time_increment" using time resolution 232, to confirm the accuracy of the time increment. Then, time information calculator 24 calculates the value of time information 241 using the following calculation.

(The value given by the time information previously calculated)+(time increment)=(the value of time information 241)

Time information calculator 24 stores the calculated value of time information 241 every time it calculates the value of time information 241. Here, time information calculator 24 uses the combination of "modulo_time_base" and "vop_time_increment" as the time increment. However, time information calculator 24 may use at least one of the following values, "modulo_time_base" and "vop_time_increment", as the time increment.

Time information calculator 24 also executes the following process.

Time information calculator 24 determines whether the calculated value of time information 241 is pertinent or not.

When the value of time information 241 is not pertinent, time information calculator 24 corrects the value. For example, if the value of time information 241 results in a negative value, time information calculator 24 increases the received value of "modulo_time_base" until the value of time information 241 comes to take a positive value. Also, when the calculated value of time information 241 is abnormal such as a case where, for example the value of time information 241 is too large compared to the value of the time information calculated previously, it is preferred that time information calculator 24 corrects to the value of time information 241 by adding an appropriate value to the value represented by the time information that was calculated previously.

Performing this correction improves the accuracy of the timestamp that is set in the RTP header portion when bit error or data loss has occurred in the transmission path.

Time information calculator 24, when the value of time information 241 has been corrected, outputs the corrected value of time information 241 to encoded stream packetizer 22.

On the other hand, when the value of time information 241 is pertinent, time information calculator 24 outputs the calculated value of time information 241 to encoded stream packetizer 22.

Encoded stream packetizer 22 receives encoded data 212 from encoded stream receiver 21 and receives time information 241 from time information calculator 24.

Encoded stream packetizer 22 RTP-packetizes encoded data 212. In this process, encoded stream packetizer 22 sets time information 241 into the timestamp in the RTP header portion of the RTP packet and sets encoded data 212 into the RTP payload portion. Then, encoded stream packetizer 22 sends out the RTP-packetized encoded data 212 as RTP packet 121 to transmission path 102.

Though the first embodiment was described by taking an example in which the encoded stream output device transmits the encoding information separately from the encoded stream, the encoded stream output device may include the encoding information in the encoded stream and transmit the encoding information.

Nevertheless, it is possible to expect improved accuracy of time information 241 when the value of time information 241 is calculated using the information (vop_time_increment_resolution) contained in encoding information 131 that is transmitted separately from encoded stream 111, compared to the case where the value of time information 241 is calculated using the information contained in the encoded stream. In other words, when a bit error or data loss has occurred in the transmission path, it is possible to lower the possibility of the value of time information 241 taking a wrong value when the value of time information 241 is calculated by using the information contained in encoding information 131 that is transmitted separately from encoded stream 111, compared to the case where the value of time information 241 is calculated by using the information contained in the encoded stream.

Also, the above example was described using MPEG-4 as the coding scheme, but other coding schemes may be used, not limited to MPEG-4.

Further, in a system where transmission path 101 is a circuit switching network and ITU-U Recommendation H.245 is used for call control, control information receiver 23 may receive the encoding information (e.g., the encoding information described using Open Logical Channel) in ITU-U Recommendation H.245. In this case, it is possible to calculate the timestamp using the information which the coding information in H.245 contains, corresponding to the aforementioned time base and time increment. That is, when transmission path 101 is a circuit switching network, it is possible to realize control information receiver 23 using an H.245 processor.

Alternatively, in a system in which transmission path 101 is a packet switching network, and control information such as encoding information etc., is exchanged using IETF Recommendation C2327 (SDP: Session Description Protocol), control information receiver 23 may receive encoding information in SDP (e.g., encoding information described with "config="). In this case, it is possible to calculate the timestamp using the information which the coding information in SDP contains, corresponding to the aforementioned time base and time increment. That is, when transmission path 101 is a packet switching network, it is possible to realize control information receiver 23 using an SDP processor.

Further, in the case where transmission path 101 is a circuit switching network, encoding information in ITU-U Recommendation H.223 may be used instead of the encoding information in ITU-U Recommendation H.245. That is, when transmission path 101 is a circuit switching network, it is possible to realize encoded stream receiver 21 using an ITU-U Recommendation H.223 processor.

Alternatively, in the case where transmission path 101 is a circuit switching network, encoding information containing RTP packets may be used instead of the encoding information in SDP. That is, when transmission path 101 is a packet switching network, it is possible to realize encoded stream receiver 21 using a RTP packet receiver.

According to the present exemplary embodiment, time information calculator 24 calculates the value of time information using the encoding information received by control information receiver 23 and the encoded stream received by encoded stream receiver 21. Time information calculator 24 corrects the value of time information and outputs the corrected time information when the value is not pertinent. Encoded stream packetizer 22 packetizes the encoded stream by setting the time information output from time information calculator 24 into the header portion.

In this case, if the time information is not pertinent, the time information is corrected. Accordingly, even if, for example a bit error or data loss occurs in the transmission path, it is possible to set up pertinent time information in the packet. As a result, it is possible to improve the accuracy of the time information that is set up in the packet.

(Exemplary Embodiment 2)

Figure 4:
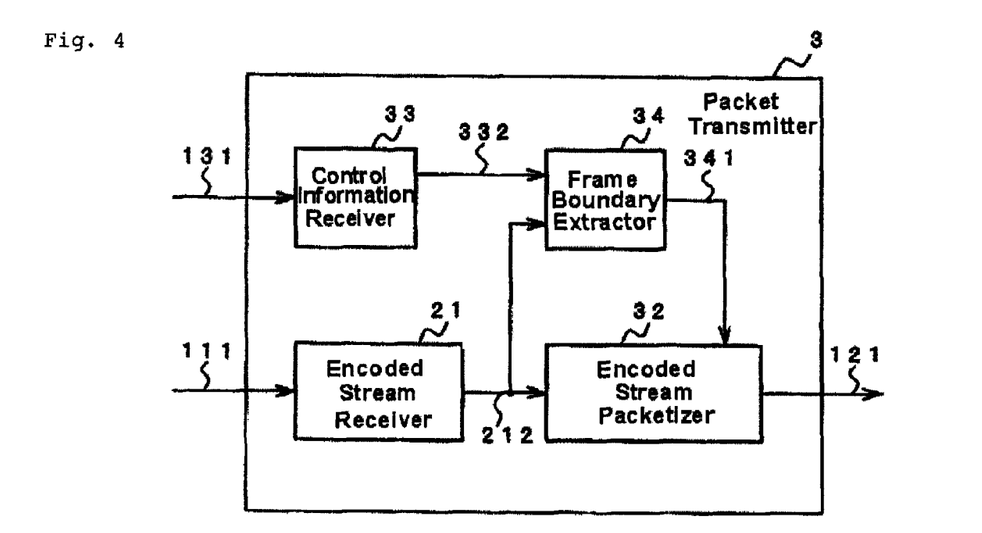
FIG. 4 is a block diagram showing a configurational example of a packet transmitter of the second exemplary embodiment.

FIG. 4 is a block diagram showing a configurational example of a packet transmitter of the second exemplary embodiment. Packet transmitter 3 shown in FIG. 4 corresponds to packet transmitter 100 shown in FIG. 2.

Packet transmitter 3 includes encoded stream receiver 21, encoded stream packetizer 32, control information receiver 33 and frame boundary extractor 34.

It should be noted that the encoded stream output device transmits encoding information, containing at least the following information at an event when an encoding stream starts to be transmitted or the like.

(4) Profile and level (profile_and_level_indication).

"Profile_and_level_indication" is information that designates the combination (profile) of encoding tools, and image size, bit rate, etc. (level).

Encoded stream receiver 21 receives encoded stream 111 from the encoded stream output device via transmission path 101. Also, encoded stream receiver 21 outputs encoded data 212.

Control information receiver 33 receives encoding information 131 from the encoded stream output device by way of transmission path 101. Also, Control information receiver 23 outputs profile 332.

Frame boundary extractor 34, using profile 332 output from control information receiver 33, extracts a frame boundary (a boundary between frames in the MPEG encoded stream) from encoded data 212 output from encoded stream receiver 21. Frame boundary extractor 34 outputs the information that indicates a frame boundary as frame boundary information 341.

Encoded stream packetizer 32 sets frame boundary information 341 output from frame boundary extractor 34 into that RTP header portion and sets encoded data 212 output from encoded stream receiver 21 into the RTP payload portion to RTP-packetize encoded stream 111. Encoded stream packetizer 32 outputs RTP-packetized encoded stream 111 as RTP packet 121. RTP packet 121 is transmitted to the packet receiver via transmission path 102.

Next, the operation of packet transmitter 3 will be described with reference to FIGS. 2 and 4.

When receiving encoding information 131 from the encoded stream output device via transmission path 101, control information receiver 33 extracts "profile_and_level_indication" from encoding information 131, Control information receiver 33 outputs the extracted "profile_and_level_indication" as profile 332 to frame boundary extractor 34.

Encoded stream receiver 21, as it receives encoded stream 111 from the encoded stream output device via transmission path 101, deletes the header information or the like that has been provided for transmission through transmission path 101, from encoded stream 111. Encoded stream receiver 21 outputs encoded stream 111 with its header information and the like deleted, as encoded data 212 to encoded stream packetizer 32 and frame boundary extractor 34.

Frame boundary extractor 34 receives encoded data 212 from encoded stream receiver 21 and receives profile 332 from control information receiver 33.

Frame boundary extractor 34, using profile 332, extracts a frame boundary from encoded data 212.

For example, first, frame boundary extractor 34 determines the start code to be used as a frame boundary. Here, the start code may be "vop_start_code" or any other start code may be used.

Subsequently, frame boundary extractor 34 detects whether the determined start code is present or not in encoded data 212. If frame boundary extractor 34 detects the presence of the start code in encoded data 212, the start code is extracted as a frame boundary. Frame boundary extractor 34 outputs frame boundary information 341 (frame boundary information 341 having a significant value (e.g., "1")) that represents a frame boundary. If not, it outputs frame boundary information 341 (frame boundary information 341 of "0" for example) that represents no frame boundary.

Frame boundary extractor 34 also performs the following process.

For example, when frame boundary extractor 34 has extracted the start code as a frame boundary, it analyzes the following encoded data 212 (specifically, the encoded type of encoded data 212) so as to check whether the frame boundary is pertinent or not.

If the frame boundary is not pertinent, frame boundary extractor 34 corrects the frame boundary. For example, frame boundary extractor 34 outputs frame boundary information 341 of "0".

Alternatively, frame boundary extractor 34 may check whether the frame boundary is pertinent or not based on the header information or the like that has been given for transmission through transmission path 101.

Making correction as above enables improvement of the accuracy of the marker bit set in the RTP header portion when an error or data loss has occurred in the transmission path.

Encoded stream packetizer 32 receives encoded data 212 from encoded stream receiver 21 and receives frame boundary information from frame boundary extractor 34.

Encoded stream packetizer 32 RTP-packetizes encoded data 212. In this process, encoded stream packetizer 32 sets frame boundary information 341 into the marker bit in the RTP header portion and also sets encoded data 212 into RTP payload portion. Then, encoded stream packetizer 32 sends out the RTP-packetized encoded data 212 as RTP packets 121 to transmission path 102.

Though the second embodiment was described by taking an example in which the encoded stream output device transmits the encoding information separately from the encoded stream, the encoded stream output device may transmit the encoding information together with the encoded stream.

Nevertheless, it is possible to expect improved accuracy of frame boundary information 341 when frame boundary information 341 is generated using the information (profile_and_level_indication) contained in encoding information 131 that is transmitted separately from encoded stream 111, compared to the case where frame boundary information 341 is generated using the information contained in the encoded stream. In other words, when a bit error or data loss has occurred in the transmission path, it is possible to lower the possibility of frame boundary information 341 becoming incorrect, compared to the case where frame boundary information 341 is generated using the information contained in encoded stream 111.

Also, the above example was described using MPEG-4 as the coding scheme, but other coding schemes may be used, not limited to MPEG-4.

Further, in a system where transmission path 101 is a circuit switching network and ITU-U Recommendation H.245 is used for call control, control information receiver 33 may receive encoding information in H.245. In this case, it is possible to determine the marker bit using information that corresponds to profile 332 of the coding information in H.245. That is, when transmission path 101 is a circuit switching network, it is possible to realize control information receiver 33 using an H.245 processor.

Alternatively, in a system in which transmission path 101 is a packet switching network, and control information such as encoding information etc., is exchanged using IETF Recommendation C2327 (SDP), control information receiver 23 may receive encoding information in SDP. In this case, it is possible to determine the marker bit using the information that corresponds to the aforementioned profile 332 of the encoding information in SDP. That is, when transmission path 101 is a packet switching network, it is possible to realize control information receiver 33 using an SDP processor.

According to the present exemplary embodiment, frame boundary extractor 34 extracts a frame boundary from the encoding stream received by encoded stream receiver 21, using the encoding information received by control information receiver 33. Frame boundary extractor 34 corrects the frame boundary when the frame boundary is not pertinent. Frame boundary information 34 outputs the information representing the corrected frame boundary. Encoded stream packetizer 32 packetizes the encoded stream by setting the information representing the frame boundary output by frame boundary extractor 34 into the header portion.

In this case, if the frame boundary is not pertinent, the frame boundary is corrected. Accordingly, even if, for example a bit error or data loss occurs in the transmission path, it is possible to set up a pertinent frame boundary in the packet. That is, it is possible to improve the accuracy of the frame boundary that is set up in the packet.

(Exemplary Embodiment 3)

Figure 5:
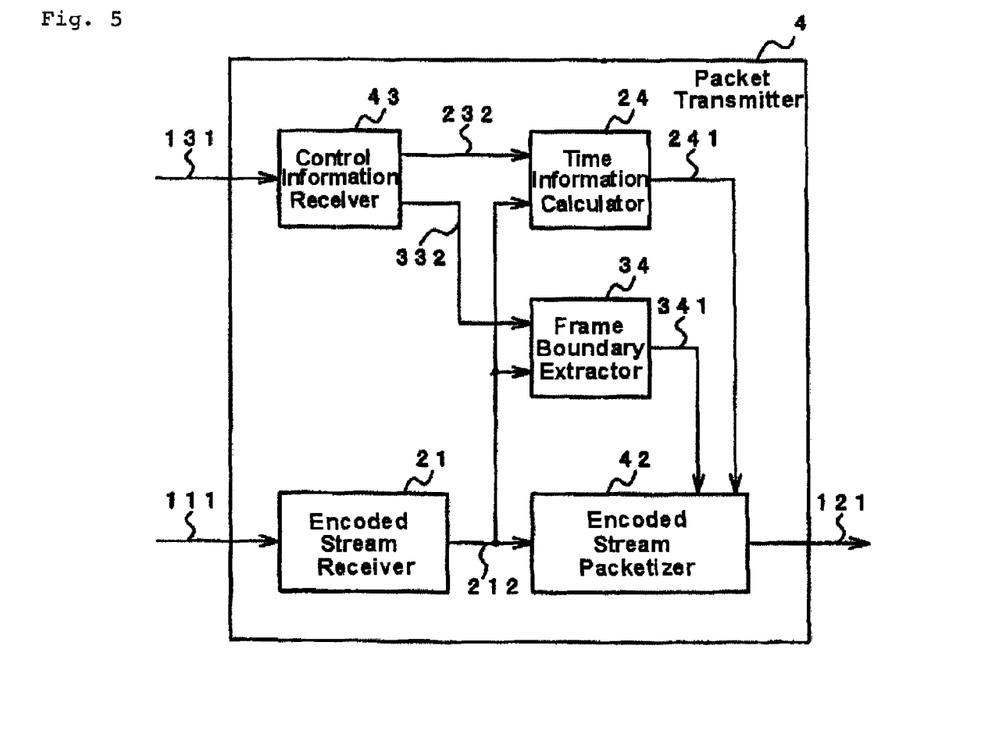
FIG. 5 is a block diagram showing a configurational example of a packet transmitter of the third exemplary embodiment.

FIG. 5 is a block diagram showing a configurational example of a packet transmitter of the third exemplary embodiment. Packet transmitter 4 shown in FIG. 5 corresponds to packet transmitter 100 shown in FIG. 2.

Packet transmitter 4 includes encoded stream receiver 21, time information calculator 24, frame boundary extractor 34, encoded stream packetizer 42 and control information receiver 43. Description hereinbelow will be made mainly referring to the configurations that are different from those of the first and second exemplary embodiments.

It should be noted that the encoded stream output device transmits encoding information, containing at least following information at an event when an encoding stream starts to be transmitted or the like.

(1) Time resolution (vop_time_increment_resolution)
(4) Profile and level (profile_and_level_indication)

Further, the encoded stream output device transmits an encoded stream in VOP (video_object_plane) units. The VOP header in VOP contains information as follows, for example.

(2) Time base (modulo_time_base)
(3) Lapse time (e.g., vop_time_increment)

When packetizing encoded stream 11, encoded stream packetizer 42 sets time information 241 output from time information calculator 24 and frame boundary information 341 output from frame boundary extractor 34 into the RTP header portion.

When receiving encoding information 131 from the encoded stream output device via transmission path 101, control information receiver 43 extracts "vop_time_increment_resolution" and "profile_and_level_indication" from encoding information 131. Control information receiver 43 outputs the extracted "vop_time_increment_resolution" as time resolution 232 to time information calculator 24 and outputs the extracted "profile_and level_indication" as profile 332 to frame boundary extractor 34.

The components other than encoded stream packetizer 42 and control information receiver 43 are the same as those in the first or second exemplary embodiment.

Next, the operation of packet transmitter 4 will be described with reference to FIGS. 2 and 5.

When receiving encoding information 131 from the encoded stream output device via transmission path 101, control information receiver 43 extracts "vop_time_increment_resolution" from encoding information 131. Control information receiver 43 outputs the extracted "vop_time_increment_resolution" as time resolution 232 to time information calculator 24.

Further, control information receiver 43 extracts "profile_and_level_indication" from encoding information 131. Control information receiver 43 outputs the extracted "profile_and_level_indication" as profile 332 to frame boundary extractor 34.

Time information calculator 24 operates in the same manner as in the first exemplary embodiment. Frame boundary extractor 34 operates in the same as in the second exemplary embodiment.

Encoded stream packetizer 42 receives encoded data 212 from encoded stream receiver 21 and receives frame boundary information 341 from frame boundary extractor 34.

Encoded stream packetizer 42 RTP-packetizes encoded data 212. In this process, encoded stream packetizer 42 sets frame boundary information 341 into the marker bit in the RTP header portion and also sets encoded data 212 into the RTP payload portion. Then, encoded stream packetizer 42 sends out the RTP-packetized encoded data 212 as RTP packet 121 to transmission path 102.

In this exemplary embodiment, packet transmitter 4 has both the configuration of the first exemplary embodiment and the configuration of the second exemplary embodiment. Accordingly, both the effect of the first exemplary embodiment and the effect of the second exemplary embodiment can be obtained.

Here, use of other coding schemes, not limited to MPEG-4, is also permitted since the situation is the same with the first and second exemplary embodiments. Further, in a system where transmission path 101 is a circuit switching network and ITU-U Recommendation H.245 is used for call control, it is possible to calculate the timestamp and determine the marker bit using the encoding information in H.245. That is, when transmission path 101 is a circuit switching network, it is possible to realize control information receiver 43 using an H.245 processor.

Alternatively, in a system in which transmission path 101 is a packet switching network, and control information such as encoding information etc., is exchanged using IETF Recommendation C2327(SDP), it is possible to calculate the timestamp and determine the marker bit using the encoding information in SDP. That is, when transmission path 101 is a packet switching network, it is possible to realize control information receiver 43 using an SDP processor.

According to the present exemplary embodiment, time information calculator 24 calculates the value of time information using the encoding information received by control information receiver 23 and the encoded stream received by encoded stream receiver 21. Time information calculator 24 corrects the time information and outputs the corrected time information when the value is not pertinent. Frame boundary extractor 34 extracts the frame boundary from the encoding stream received by encoded stream receiver 21, using the encoding information received by control information receiver 33. Frame boundary extractor 34 corrects the frame boundary when the frame boundary is not pertinent. Frame boundary extractor 34 outputs the information representing the corrected frame boundary. Encoded stream packetizer 22 packetizes the encoded stream by setting the time information output by time information calculator 24 and the information representing the frame boundary output by frame boundary extractor 34 into the header portion.

In this case, even if, for example a bit error or data loss occurs in the transmission path, it is possible to set up the pertinent time information and the information representing the frame boundary. As a result, it is possible to improve the accuracy of the time information and information representing the frame boundary which are set up in the packet.

Here, each of the above embodiments was described taking the RTP packet as a packet example. However, the packets that can be handled in the encoded stream transmitter of the present invention are not limited to the RTP packet. The encoded stream transmitter may be a device that creates other kinds of packets as long as the packet can be set with information corresponding to the timestamp and marker bit.

The present invention can be applied to terminal devices and media distribution servers and the like, which are connected to a transmission path such as a circuit switching network or packet switching network and which packetize the received encoded stream via the transmission path and send out the packetized encoded stream.

The invention claimed is:

1. An encoded stream transmitter for packetwise transmission of an encoded stream, comprising:
    an encoded stream receiver that receives said encoded stream;
    a control information receiver that receives an encoding information of said encoded stream;
    a time information calculator that calculates a value of time information, using the encoding information received by said control information receiver and the encoded stream received by said encoded stream receiver, outputs the calculated value of time information when the calculated value is pertinent, and corrects the calculated value and outputs the corrected value of time information when the calculated value is not pertinent; and
    an encoded stream packetizer that packetizes the encoded stream received by said encoded stream receiver by setting the time information output by said time information calculator into a header portion.

2. An encoded stream transmitter for packetwise transmission of an encoded stream, comprising:
    an encoded stream receiver that receives said encoded stream;
    a control information receiver that receives an encoding information of said encoded stream;
    a frame boundary extractor that, using the encoding information received by said control information receiver, extracts a frame boundary from the encoded stream received by said encoded stream receiver, and outputs the information representing said extracted frame when said extracted frame boundary is pertinent and corrects said frame boundary and outputs the information representing the corrected frame boundary when said extracted frame boundary is not pertinent; and
    an encoded stream packetizer that packetizes the encoded stream received by said encoded stream receiver by setting the information representing the frame boundary output from the frame boundary extractor into a header portion.

3. The encoded stream transmitter according to claim 2, comprising: a time information calculator that calculates a value of time information, using the encoding information received by said control information receiver and the encoded stream received by said encoded stream receiver, outputs the calculated value of time information when the calculated value is pertinent, and corrects the calculated value and outputs the corrected value of time information when the calculated value is not pertinent;
    wherein said encoded stream packetizer that packetizes the encoded stream received by said encoded stream receiver by setting the time information output by said time information calculator and the information representing the frame boundary output from the frame boundary extractor into the header portion.

4. The encoded stream transmitter according to claim 1, wherein
    said encoded stream receiver receives an MPEG-4 based encoded stream, and said time information calculator calculates said time information using at least one of following values, "modulo_time_base" and "vop_time_increment", contained in the encoded stream received by said encoded stream receiver.

5. The encoded stream transmitter according to claim 2, wherein
said encoded stream receiver receives an MPEG-4 based encoded stream, and
said frame boundary extractor extracts said frame boundary, using the start code contained in the encoded stream received by said encoded stream receiver.

6. The encoded stream transmitter according to claim 1, wherein
said control information receiver receives MPEG-4 based DCI as said encoding information and extracts "vop_time_increment_resolution" from said DCI; and
said time information calculator calculates said time information, using said "vop_time_increment_resolution" extracted by the control information receiver and the encoded stream received by said encoded stream receiver.

7. The encoded stream transmitter according to claim 1, wherein
said control information receiver receives MPEG-4 based DCI as said encoding information and extracts "profile_and_level_indication" from said DCI; and
said frame boundary extractor extracts said frame boundary from the encoded stream received by said encoded stream receiver, using said "profile_and_level_indication" extracted by said control information receiver.

8. The encoded stream transmitter according to claim 1, wherein said control information receiver receives encoding information based on IETF Recommendation RFC2327 (SDP) as said encoding information.

9. The encoded stream transmitter according to claim 1, wherein said control information receiver receives encoding information based on ITU-T Recommendation H.245 as said encoding information.

10. The encoded stream transmitter according to claim 1, wherein said control information receiver receives MPEG-4 based DCI as said encoding information.

11. An encoded stream transmission method for packet-wise transmission of an encoded stream, comprising:
receiving said encoded stream;
receiving an encoding information of said encoded stream;
calculating a value of time information, using the encoding information and the encoded stream, outputs the calculated value of time information when the calculated value is pertinent, and corrects the calculated value and outputs the corrected value of time information when the calculated value is not pertinent; and
packetizing the encoded stream received by setting the time information into a header portion.

12. An encoded stream transmission method for packet-wise transmission of an encoded stream, comprising:
receiving said encoded stream;
receiving an encoding information of said encoded stream;
using the encoding information, extracts a frame boundary from the encoded stream, and outputs the information representing said extracted frame when said extracted frame boundary is pertinent and corrects said frame boundary and outputs the information representing the corrected frame boundary when said extracted frame boundary is not pertinent; and
packetizing the encoded stream by setting the information representing the frame boundary into a header portion.

13. The encoded stream transmission method according to claim 12, wherein
calculating a value of time information, using the encoding information and the encoded stream, outputs the calculated value of time information when the calculated value is pertinent, and corrects the calculated value and outputs the corrected value of time information when the calculated value is not pertinent; and
packetizing the encoded stream by setting the time information and the information representing the frame boundary into the header portion.

14. The encoded stream transmission method according to claim 11, wherein
receiving an MPEG-4 based encoded stream, and
calculating said time information using at least one of following values, "modulo_time_base" and "vop_time_increment", contained in the encoded stream.

15. The encoded stream transmission method according to claim 12, wherein
receiving an MPEG-4 based encoded stream, and
extracting said frame boundary, using the start code contained in the encoded stream.

16. The encoded stream transmission method according to claim 11, wherein
receiving MPEG-4 based DCI as said encoding information and extracts "vop_time_increment_resolution" from said DCI; and
calculating said time information, using said "vop_time_increment _resolution" and the encoded stream.

17. The encoded stream transmission method according to claim 12, wherein
receiving MPEG-4 based DCI as said encoding information and extracts "profile_and_levevl indication" from said DCI; and
extracting said frame boundary from the encoded stream, using said "profile_and_level_indication".

18. The encoded stream transmission method according to claims 11, wherein receiving encoding information based on IETF Recommendation RFC2327(SDP) as said encoding information.

19. The encoded stream transmission method according to claims 11, wherein receiving encoding information based on ITU-T Recommendation H.245 as said encoding information.

20. The encoded stream transmission method according to claims 11, wherein receiving MPEG-4 based DCI as said encoding information.

* * * * *